US010711906B2

(12) United States Patent
Yamagata et al.

(10) Patent No.: US 10,711,906 B2
(45) Date of Patent: Jul. 14, 2020

(54) VALVE AND FUEL CELL SYSTEM (71) Applicant: Murata Manufacturing Co., Ltd., Nagaokakyo-shi, Kyoto-fu (JP)

(72) Inventors: Hideaki Yamagata, Nagaokakyo (JP); Takenobu Maeda, Nagaokakyo (JP); Yuzo Higashiyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 605 days.

(21) Appl. No.: 14/302,520

(22) Filed: Jun. 12, 2014

(65) Prior Publication Data
US 2014/0295310 A1  Oct. 2, 2014

Related U.S. Application Data (63) Continuation of application No. PCT/JP2012/082145, filed on Dec. 12, 2012.

(30) Foreign Application Priority Data

Dec. 16, 2011 (JP) ................. 2011-275166

(51) Int. Cl.
*F16K 15/18* (2006.01)
*F16K 31/126* (2006.01)
(Continued)

(52) U.S. Cl.
CPC .............. *F16K 15/18* (2013.01); *F16K 7/12* (2013.01); *F16K 15/144* (2013.01);
(Continued)

(58) Field of Classification Search
CPC .. F16K 15/185; F16K 27/0236; F16K 31/126; F16K 31/1266; F16K 31/128;
(Continued)

(56) References Cited

U.S. PATENT DOCUMENTS 4,660,597 A * 4/1987 Cowles .................. F02M 69/54
137/505.39
4,794,940 A * 1/1989 Albert .................. F16K 31/1266
137/1

(Continued)

FOREIGN PATENT DOCUMENTS

DE 102015005692 A1 * 11/2016 ............... F16K 7/17
JP 2004-031199 A 1/2004
(Continued)

OTHER PUBLICATIONS

Official Communication issued in International Patent Application No. PCT/JP2012/082145, dated Feb. 12, 2013.

*Primary Examiner* — Hailey K. Do
(74) *Attorney, Agent, or Firm* — Keating & Bennett, LLP (57) ABSTRACT A valve includes a cap, a diaphragm defining a movable portion, a valve housing, and a valve portion. An inlet port through which fluid flows into a valve chamber, an outlet port through which the fluid flows out from the valve chamber, and a placement portion on which a peripheral edge portion of the diaphragm is placed are provided in the valve housing. The diaphragm includes a peripheral edge portion, a center portion, a connecting portion connecting the peripheral edge portion and the center portion, and a pusher. The connecting portion has a wave shape from the peripheral edge portion side toward the center portion side such that the connecting portion first projects to a valve body portion side, and next projects to the cap side.

19 Claims, 8 Drawing Sheets (51) Int. Cl.
*F16K 15/14* (2006.01)
*F16K 7/12* (2006.01)
*H01M 8/04082* (2016.01)
*G05D 16/06* (2006.01)
*H01M 8/1011* (2016.01)
*H01M 8/04186* (2016.01)

(52) U.S. Cl.
CPC ........ *F16K 31/126* (2013.01); *F16K 31/1266* (2013.01); *G05D 16/0647* (2013.01); *H01M 8/04201* (2013.01); *H01M 8/04186* (2013.01); *H01M 8/1011* (2013.01); *Y02E 60/523* (2013.01); *Y10T 137/7781* (2015.04)

(58) Field of Classification Search
CPC ........ F16K 15/144; F16K 15/145; F16K 7/14; F16K 7/123; F16K 7/00; F16K 7/17; F16K 7/12; F16K 7/20; F16K 99/0015; F16K 99/0055; F16K 99/0059; F16K 99/0061; F16K 99/0005; Y10T 137/7876; Y10T 137/7881; Y10T 137/7895
USPC ... 251/14, 25, 28, 30.02, 46, 331, 335.2, 61, 251/61.1, 61.2
See application file for complete search history.

(56) References Cited

U.S. PATENT DOCUMENTS

| | | | | |
|---|---|---|---|---|
| 5,177,579 A * | 1/1993 | Jerman | ................ | G01L 9/0042 200/83 N |
| 5,769,387 A * | 6/1998 | Perez C. | .................. | F16K 7/17 251/61.1 |
| 5,979,409 A * | 11/1999 | Robinson | ............... | F02M 69/54 123/456 |
| 6,058,970 A * | 5/2000 | Osaki | ............... | B60K 15/03504 137/141 |
| 6,321,776 B1 * | 11/2001 | Pratt | ........................ | F16K 7/14 137/312 |
| 6,405,996 B1 * | 6/2002 | Alsop | ...................... | F16K 7/17 251/331 |
| 6,537,258 B1 * | 3/2003 | Guala | .................. | A61M 39/24 137/522 |
| 6,668,848 B2 * | 12/2003 | Lafler | .................. | B60T 13/683 137/1 |
| 6,874,534 B2 * | 4/2005 | Diana | ...................... | B05B 9/03 137/599.11 |
| 7,947,094 B2 * | 5/2011 | Fiebig | ................ | H01M 8/0631 429/416 |
| 2002/0127146 A1 * | 9/2002 | Bergh | .................... | G01N 30/20 422/89 |
| 2007/0178351 A1 | 8/2007 | Saito | | |
| 2007/0252103 A1 * | 11/2007 | Wu | .......................... | F16K 7/17 251/335.2 |
| 2008/0029725 A1 * | 2/2008 | Ito | ............................ | F16K 7/14 251/129.17 |
| 2008/0099081 A1 * | 5/2008 | Yamamoto | ................ | F16K 1/36 137/497 |
| 2009/0095363 A1 | 4/2009 | Nakakubo et al. | | |

FOREIGN PATENT DOCUMENTS

| | | |
|---|---|---|
| JP | 2005-276682 A | 10/2005 |
| JP | 2006-163733 A | 6/2006 |
| JP | 2008-059093 A | 3/2008 |
| JP | 2011-057179 A | 3/2011 |
| JP | 2011-226531 A | 11/2011 |
| WO | 2012/023395 A1 | 2/2012 |
| WO | 2012/141064 A1 | 10/2012 |

* cited by examiner

VALVE AND FUEL CELL SYSTEM

BACKGROUND OF THE INVENTION

1. Field of the Invention

The present invention relates to a valve configured to control excess flow of fluid in a forward direction and a fuel cell system including the valve.

2. Description of the Related Art

Japanese Unexamined Patent Application Publication No. 2008-59093 discloses a passive drive-type pressure reducing valve that is used for a small-sized fuel cell. The pressure reducing valve is configured such that when a pressure of fluid reaches a set pressure, the valve is opened or closed automatically using pressure difference.

Figure 9A:
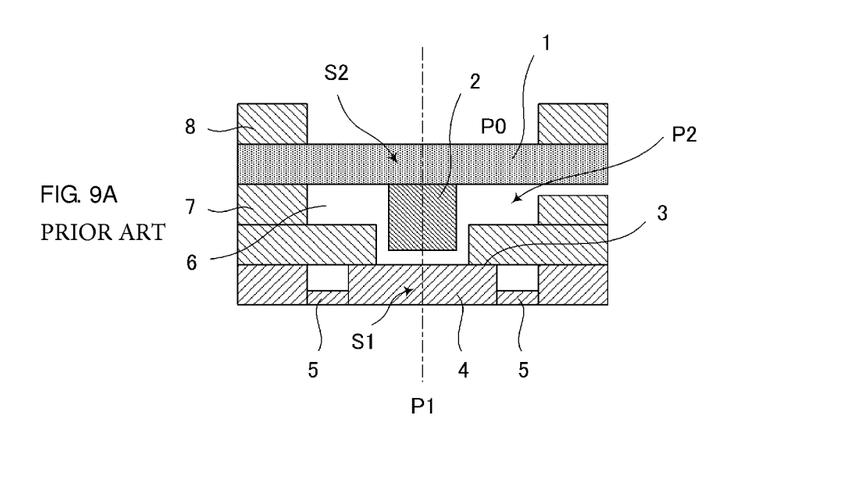
FIGS. 9A and 9B are cross-sectional views for explaining the configuration of a valve as disclosed in Japanese Unexamined Patent Application Publication No. 2008-59093.
Figure 9B:
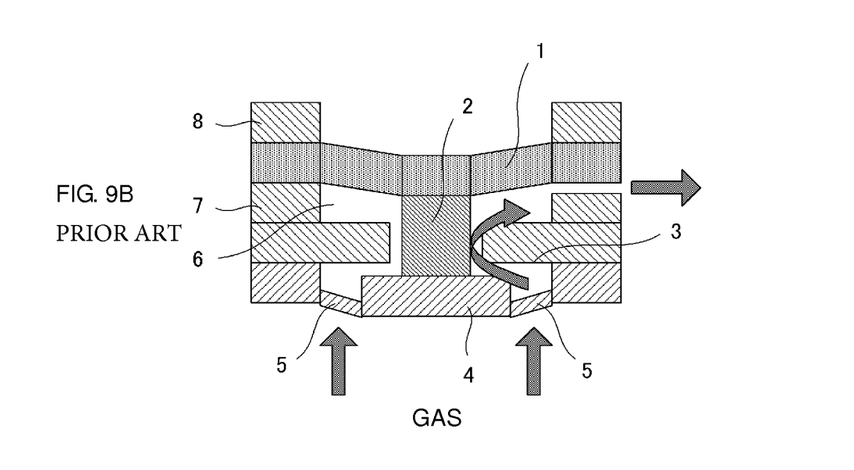

FIG. 9A and FIG. 9B illustrate cross-sectional views of the pressure reducing valve disclosed in Japanese Unexamined Patent Application Publication No. 2008-59093. The pressure reducing valve is constituted by a diaphragm 1 serving as a movable portion, a piston 2 serving as a transmission mechanism, a valve seat portion 3, and a valve body portion 4 and a supporting portion 5 forming a valve portion. The valve body portion 4 is supported by the supporting portion 5 with respect to surrounding portions, and abuts against the valve seat portion 3 in a valve closed state (see FIG. 9A). The supporting portion 5 is formed by an elastic beam.

The respective members are configured by plate-shaped members and the pressure reducing valve is formed by bonding the respective members. A peripheral edge portion of the diaphragm 1 is held between a valve housing 7 and a cap 8, and the valve housing 7 configures a valve chamber 6 together with the diaphragm 1.

It is assumed that a pressure of an upper portion of the diaphragm 1 is P0, a primary pressure of a valve upstream portion is P1, a pressure of a valve downstream portion is P2, an area of the valve body portion 4 is S1, and an area of a portion of the diaphragm 1 which contacts with the valve chamber 6 (hereinafter, referred to as a pressure receiving area) is S2. In this case, a condition under which the valve is opened is represented by $(P1-P2)S1<(P0-P2)S2$ based on pressure balance. When P2 is higher than the pressure satisfying the condition, the valve is closed; when P2 is lower than that, the valve is opened. This enables P2 to be kept constant.

For example, a direct methanol fuel cell (DMFC) includes a pump that transports liquid fuel (methanol) to a power generation cell (at the downstream side of the pump) from a fuel cartridge (at the upstream side of the pump). When the pump uses a valve system, the pump has a check function for blocking flow of the fluid to the upstream side of the pump from the downstream side of the pump, with a valve. However, the pump does not generally have a function for blocking excess flow of the liquid fuel from the upstream side of the pump to the downstream side of the pump, that is, a forward check function.

For example, in a direct methanol fuel cell system, a fuel cartridge that is incorporated in the fuel cell system is heated to a high temperature due to a heating component in some cases. When the fuel cartridge is heated to a high temperature, the liquid fuel in the fuel cartridge expands. Therefore, a high-pressure liquid fuel may be discharged from the fuel cartridge in some cases. Accordingly, with the pump of the valve system which does not have the forward check function, an excess amount of liquid fuel is supplied to the power generation cell so that the liquid fuel is transported from the fuel cartridge to the power generation cell undesirably even in a state of non-operating the pump. Further, the pump may be broken in some cases.

In order to solve the problem, it is desired that such a valve stops the flow in the forward direction when, for example, a high-pressure liquid fuel is applied. The inventors of the present application have discovered that such a valve stops the flow in the forward direction when, for example, a high-pressure liquid fuel is applied and that is opened and closed with pressure of the pump is provided between the fuel cartridge and the pump. In the pressure reducing valve in Japanese Unexamined Patent Application Publication No. 2008-59093 as illustrated in FIG. 9A, the diaphragm 1 is made of rubber, for example. In order to ensure a sealing property of the valve chamber 6, a method in which both main surfaces of the peripheral edge portion of the diaphragm 1 are pressed is generally used. In the pressure reducing valve in Japanese Unexamined Patent Application Publication No. 2008-59093, the peripheral edge portion of the diaphragm 1 is held between the valve housing 7 and the cap 8.

In the pressure reducing valve described in Japanese Unexamined Patent Application Publication No. 2008-59093, however, there has been a problem that when the peripheral edge portion of the diaphragm 1 is pressed, the diaphragm 1 is bent and the piston 2 is displaced to the valve body portion 4 side. In the pressure reducing valve described in Japanese Unexamined Patent Application Publication No. 2008-59093, as illustrated in FIG. 9B, there is a risk that the piston 2 pushes down the valve body portion 4 and, at worst, may open the valve unintentionally in the state of non-operating the pump.

SUMMARY OF THE INVENTION

Preferred embodiments of the present invention provide a valve that significantly reduces or prevents displacement to a side of a valve body portion and blocks excess flow of fluid in a forward direction even when a peripheral edge portion of a diaphragm is pressed, and also provide a fuel cell system including the valve.

A valve according to a preferred embodiment of the present invention includes a valve housing including an inlet port of fluid and an outlet port of the fluid; a diaphragm that includes a center portion, a peripheral edge portion located outside of the center portion, and a connecting portion connecting the center portion and the peripheral edge portion, the peripheral edge portion being located on the valve housing and defining a valve chamber together with the valve housing, and the center portion and the connecting portion being displaced with pressure of the fluid in the valve chamber; a pressure receiving plate that is located on the center portion of the diaphragm; a valve body that is arranged in the inlet port and is deformed in response to displacement of the diaphragm to block or release inflow of the fluid into the valve chamber through the inlet port; and a cap that holds the peripheral edge portion of the diaphragm between the cap and the valve housing, in which the connecting portion of the diaphragm has a wave shape from the peripheral edge portion side toward the center portion side such that the connecting portion first projects to the valve body side, and next projects to the cap side.

In this configuration, when the cap is fixed to the valve housing, the peripheral edge portion of the diaphragm is pressed and held between the cap and the valve housing. As a result, the peripheral edge portion of the diaphragm is compressed by the cap and the valve housing, so that tight contact at an abutment portion between the peripheral edge portion of the diaphragm and the valve housing is enhanced. This ensures the sealing property of the valve chamber.

Further, in this configuration, the diaphragm includes the connecting portion having the above-mentioned wave shape. Therefore, when the peripheral edge portion of the diaphragm is compressed by the cap and the valve housing, a force of moment acts on the center portion of the diaphragm which is connected to the connecting portion so as to displace the center portion to the cap side (to be specific, in the direction of being separated from the valve body).

With this configuration, the force of moment that displaces the center portion of the diaphragm in the direction of being separated from the valve body acts thereon. Accordingly, even when the peripheral edge portion of the diaphragm is pressed, the displacement to the valve body portion side is significantly reduced or prevented in comparison with the existing technique.

Further, even when a fuel cartridge incorporated in a fuel cell system is heated to a high temperature due to a heating component and liquid fuel in the fuel cartridge expands, this configuration prevents the valve from being opened in the non-operating state of the pump. This also prevents supply of an excess amount of fuel to the power generation cell.

It is preferable that the connecting portion of the diaphragm have a shape such that a plurality of wave bottoms projecting to the valve body side and a plurality of wave peaks projecting to the cap side are alternately provided, and the number of the wave bottoms and the number of the wave peaks are preferably the same.

In this configuration, the connecting portion has the shape including the plurality of waves. Also in the configuration, the diaphragm includes the connecting portion having the wave shape. Therefore, the force of moment that displaces the center portion of the diaphragm which is connected to the connecting portion to the cap side (to be specific, in the direction of being separated from the valve body) acts thereon. Accordingly, with this configuration also, even when the peripheral edge portion of the diaphragm is pressed, the displacement of the diaphragm to the valve body portion side is significantly reduced or prevented in comparison with the existing technique.

It is preferable that the diaphragm have a configuration such that the peripheral edge portion has a thickness larger than a thickness of the center portion.

As described above, the peripheral edge portion of the diaphragm is compressed by the cap and the valve housing. Accordingly, this configuration in which the peripheral edge portion has a thickness larger than that of the center portion is preferable because the peripheral edge portion is held more reliably.

It is preferable that the diaphragm be configured such that a size of total amplitude of the wave shape of the diaphragm is equal to or smaller than the thickness of the peripheral edge portion of the diaphragm.

With this configuration, the diaphragm has a low height, so that the valve is lowered in height.

A fuel cell system according to another preferred embodiment of the present invention includes the valve according to one of the preferred embodiments of the present invention described above, a fuel storage portion that is connected to the inlet port of the valve, and a pump that is connected to the outlet port of the valve.

With this configuration, the valve according to any one of the preferred embodiments of the present invention described above is used, so that the fuel cell system including the above valve also achieves the same advantageous effects as those described above.

According to various preferred embodiments of the present invention, the valve is prevented from being opened unintentionally in a state of non-operating the pump.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Hereinafter, a valve 101 according to a first preferred embodiment of the present invention will be described.

Figure 1:
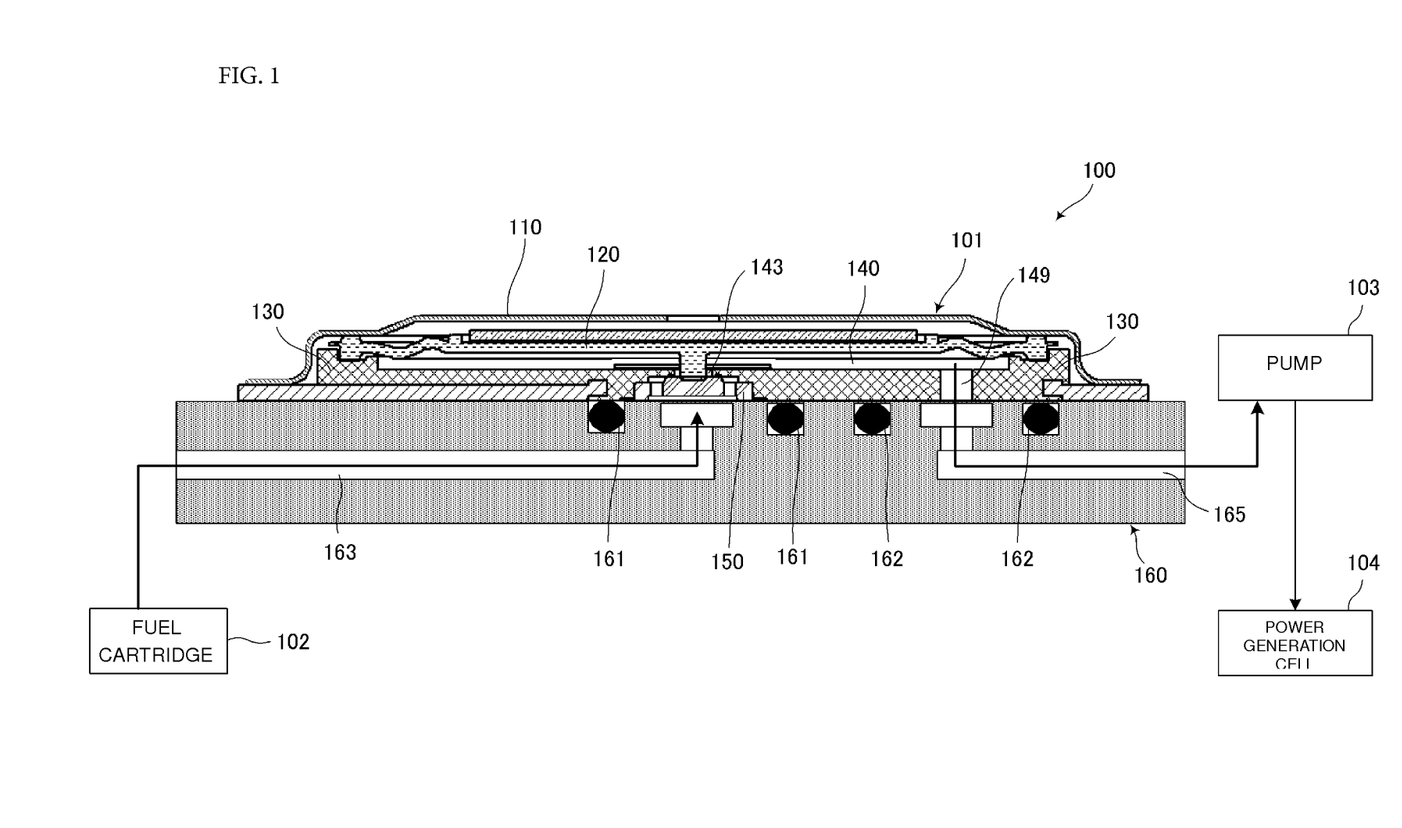
FIG. 1 is a system configuration view of a fuel cell system 100 including a valve 101 according to a first preferred embodiment of the present invention.

FIG. 1 is a system configuration view of a fuel cell system 100 including the valve 101 according to the first preferred embodiment of the present invention. The fuel cell system 100 includes a fuel cartridge 102, the valve 101, a pump 103, and a power generation cell 104. The fuel cartridge 102 stores therein methanol as liquid fuel. The pump 103 transports methanol. The power generation cell 104 receives supply of methanol from the pump 103 to generate power.

In the fuel cell system 100, methanol flows into an inlet path 163 from the fuel cartridge 102. Then, methanol flows into a valve chamber 140 through an inlet port 143 by operating the pump 103. Methanol is supplied to the power generation cell 104 from the valve chamber 140 through an outlet port 149, an outlet path 165, and the pump 103.

Although the details will be described later, the valve 101 includes a valve housing 130 constituting the valve chamber 140 together with a diaphragm 120. The inlet port 143 and the outlet port 149 are provided in the valve housing 130. The fuel cartridge 102 is connected to the inlet port 143 through the inlet path 163. The pump 103 is connected to the outlet port 149 through the outlet path 165. The valve 101 is surface-mounted on a system housing 160 with O-rings 161 and 162 in between. The inlet path 163 and the outlet path 165 are provided in the system housing 160 which is preferably made of a polyphenylene sulfide (PPS) resin, for example. The O-rings 161 and 162 are arranged and configured to prevent fluid leakage.

Figure 2:
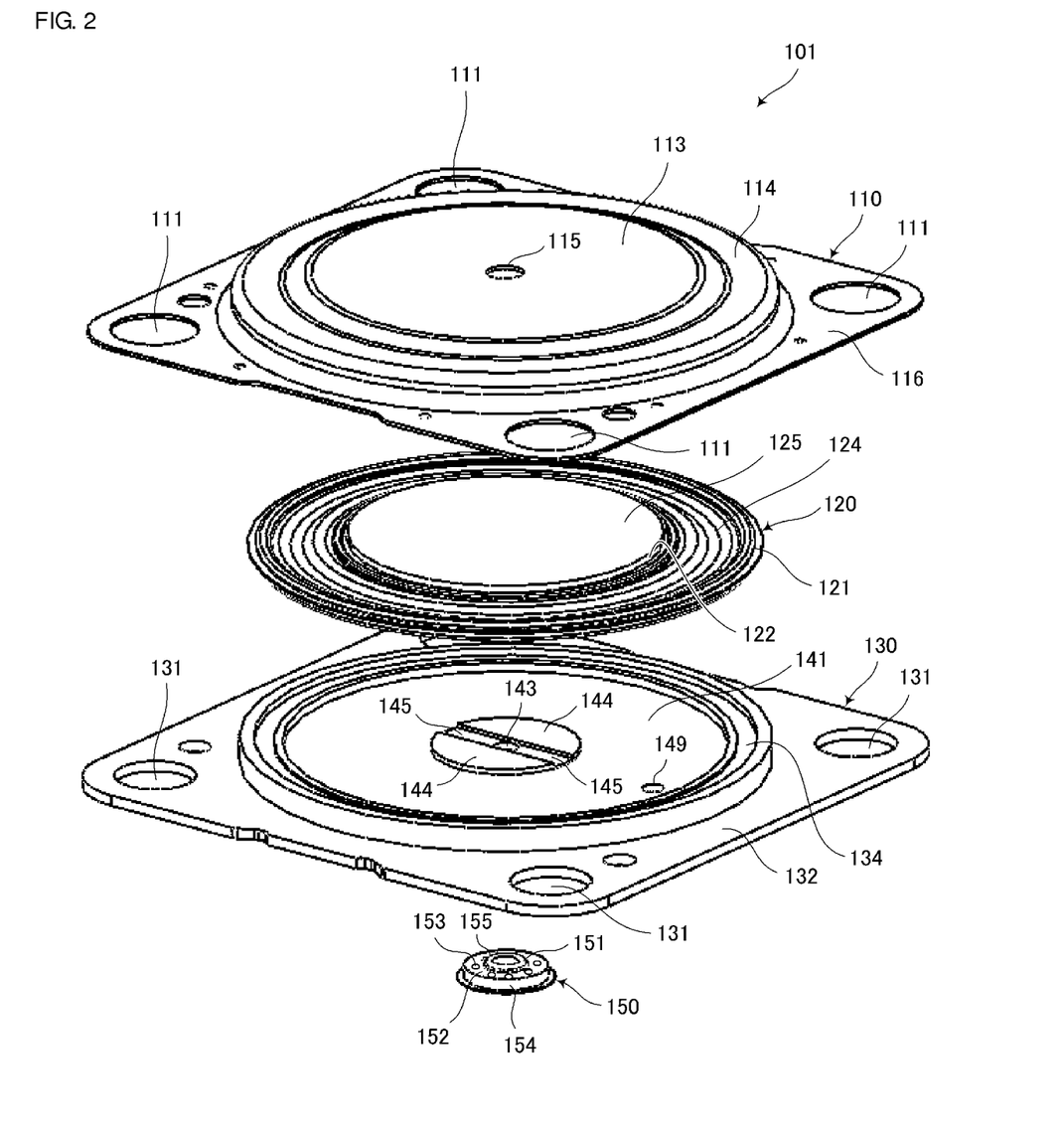
FIG. 2 is an exploded perspective view of the valve 101 illustrated in FIG. 1.
Figure 3A:
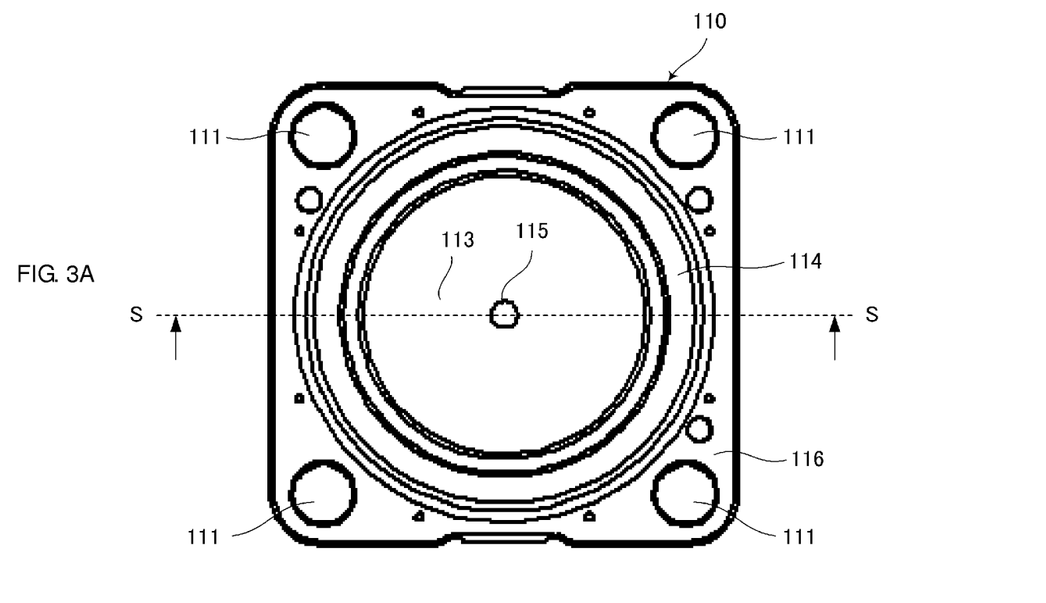
FIG. 3A is a top view of the valve 101 illustrated in FIG. 1.
Figure 3B:
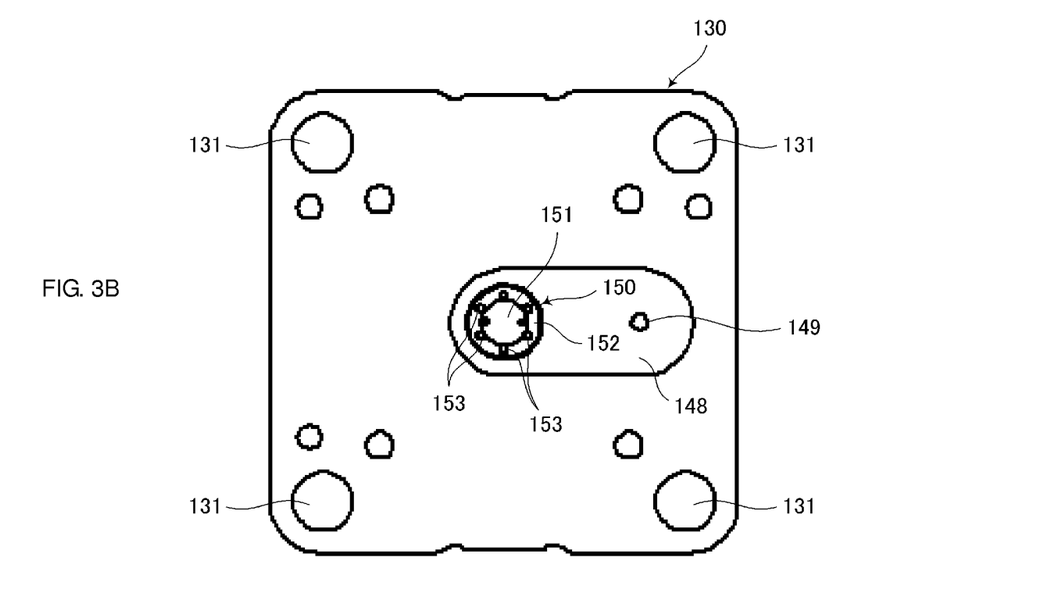
FIG. 3B is a bottom view of the valve 101 illustrated in FIG. 1.
Figure 4:
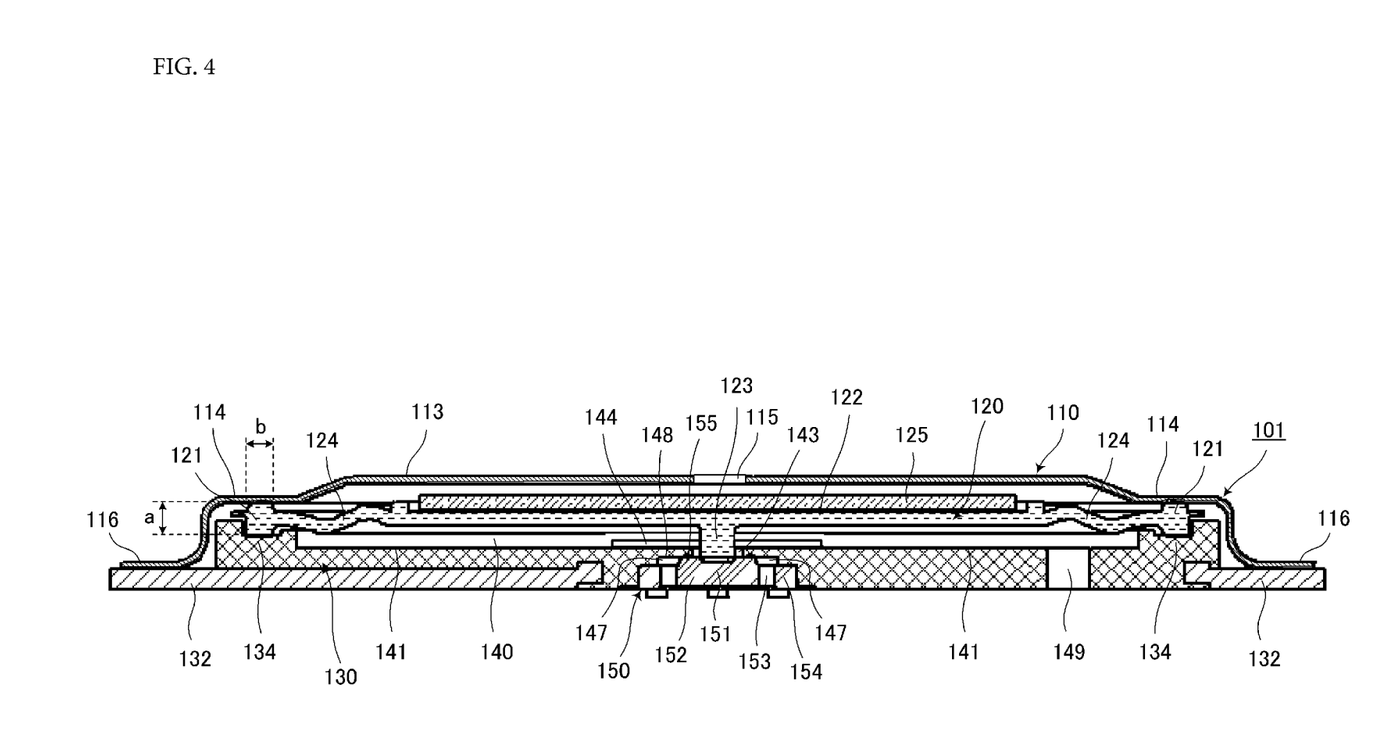
FIG. 4 is a cross-sectional view cut along a line S-S in FIG. 3A.

FIG. 2 is an exploded perspective view of the valve 101 according to the first preferred embodiment. FIG. 3A is a top view of the valve 101 in FIG. 2. FIG. 3B is a bottom view of the valve 101 in FIG. 2. FIG. 4 is a cross-sectional view cut along a line S-S in FIG. 3A.

As illustrated in the exploded perspective view in FIG. 2, the valve 101 includes a cap 110, a pressure receiving plate 125, the diaphragm 120 defining and serving as a movable portion, a valve housing 130, and a valve portion 150.

The valve housing 130 preferably has a square or substantially square plate shape, for example. The valve housing 130 is made of a metal, for example. The inlet port 143 and the outlet port 149 are provided in the valve housing 130. Fluid flows into the valve chamber 140 through the inlet port 143. The pump 103 is connected to the outlet port 149 and the fluid flows out from the valve chamber 140 through the outlet port 149 with a suction pressure of the fluid by the pump 103.

Further, screw holes 131 and a placement portion 134 are provided in the valve housing 130. The screw holes 131 are configured to secure the cap 110 and the valve housing 130 onto the system housing 160. A peripheral edge portion 121 of the diaphragm 120 is placed on the placement portion 134.

As illustrated in FIG. 2 and FIG. 4, projections 144 and a flow path 145 are arranged on the valve housing 130 around the inlet port 143 on a bottom surface 141 of the valve chamber 140 which opposes the diaphragm 120. The diaphragm 120 abuts against the projections 144 when the valve portion 150 causes the inlet port 143 and the valve chamber 140 to communicate with each other. Methanol flows to the outer side portion from the inner side portion with respect to the projections 144 through the flow path 145.

Further, as illustrated in FIG. 3B and FIG. 4, an opening 147 and a valve seat 148 are provided in the valve housing 130. The opening 147 accommodates the valve portion 150 by fitting the valve portion 150 thereinto from the mounting surface side of the valve housing 130. The valve seat 148 is located at the peripheral edge of the inlet port 143.

As materials of the valve housing 130, the portions 134, 141, 144, 145, and 148 of the valve housing 130 which contact with methanol are preferably made of a resin having high methanol resistance such as, for example, a PPS resin, while an edge portion 132 that is a portion of the valve housing 130 and does not contact with methanol is made of a metal. The valve housing 130 is formed preferably by insert molding in which the edge portion 132 made of the metal is inserted into a plastic mold for injection molding.

As illustrated in FIG. 2, the diaphragm 120 includes the peripheral edge portion 121, a center portion 122, and a connecting portion 124. The center portion 122 is located inside of the peripheral edge portion 121. The connecting portion 124 connects the peripheral edge portion 121 and the center portion 122. The diaphragm 120 preferably has a circular or substantially circular plate shape such that the thickness of the peripheral edge portion 121 is larger than that of the center portion 122. The center portion 122 preferably has a flat plate shape including a first surface and a second surface opposite the first surface. The diaphragm 120 includes a pusher 123 that projects from the center portion of the first surface of the center portion 122 and that preferably has a columnar shape, for example. The first surface of the center portion 122 opposes the valve housing 130 and the second surface of the center portion 122 opposes the pressure receiving plate 125. The area of the second surface of the center portion 122 is larger than the area of the connecting surface of the pusher 123 with the center portion 122.

The connecting portion 124 preferably has a wave shape such that the wave shape first projects to the valve body 151 side and next projects to the cap 110 side, from the peripheral edge portion 121 side toward the center portion 122 side. The wave shape of the connecting portion 124 preferably is a sine wave shape, for example. The thickness of the connecting portion 124 preferably is the same or substantially the same as the thickness of the center portion 122, and preferably is about 200 µm, for example. The connecting portion 124 preferably has a thickness that preferably is equal to or larger than about 100 µm and equal to or smaller than the thickness of the peripheral edge portion 121 of the diaphragm 120.

The thickness "a" of the peripheral edge portion 121 of the diaphragm 120 as illustrated in FIG. 4 preferably is about 500 µm and the width "b" of the peripheral edge portion 121 of the diaphragm 120 preferably is about 400 µm, for example. The size of the total amplitude of the wave shape of the connecting portion 124 is preferably set to be equal to or smaller than the thickness of the peripheral edge portion 121 of the diaphragm 120.

The diaphragm 120 includes the connecting portion 124 having the above-described wave shape, so that the center portion 122 of the diaphragm 120 is elastically supported by the peripheral edge portion 121 through the connecting portion 124 flexibly. A material of the diaphragm 120 preferably is rubber having high methanol resistance such as, for example, ethylene propylene rubber or silicone rubber.

Further, the diaphragm 120 constitutes the valve chamber 140 together with the valve housing 130 while the peripheral edge portion 121 is located on the valve housing 130. In the diaphragm 120, the center portion 122 and the connecting portion 124 inside of the peripheral edge portion 121 are displaced due to the pressure of the fluid in the valve chamber 140. When the center portion 122 of the diaphragm 120 is displaced in the direction of being closer to the valve portion 150, the pusher 123 pushes down the valve body portion 151.

When liquid is used as the fluid in the valve 101, since the surface tension of the liquid is larger, a fluid flow path which is larger in size than a flow path when gas is used in the valve 101 is required. However, the diaphragm 120 is made of rubber in the valve 101 in the present preferred embodiment, so that a movable range of the diaphragm 120 is larger than that when the diaphragm 120 is made of silicon or a metal. Therefore, the valve 101 in the present preferred embodiment ensures a sufficient flow path for methanol.

As illustrated in FIG. 2 and FIG. 4, the valve portion 150 preferably has a circular or substantially circular shape and is made of rubber having high methanol resistance such as, for example, silicone rubber. The valve portion 150 includes the valve body portion 151, a supporting portion 152, hole portions 153, and a fixing portion 154. The valve body portion 151 abuts against or is separated from the valve seat 148 with the displacement of the diaphragm 120 and blocks or releases the communication between the inlet port 143 and the valve chamber 140 so as to control the inflow of the fluid (methanol). The supporting portion 152 supports the valve body portion 151 such that the valve body portion 151 is movable in the direction of being closer to and being separated from the valve seat 148. Methanol passes through the hole portions 153. When the valve portion 150 is accommodated in the opening 147, the fixing portion 154 abuts against the inner circumferential surface of the opening 147 of the valve housing 130 so as to fix the supporting portion 152.

Although a ring-shaped valve projection 155 is preferably provided on the valve body portion 151 at the inlet port 143 side in order to enhance the sealing property with the valve seat 148, the valve projection 155 may not necessarily be provided.

It should be noted that the valve portion 150 corresponds to a "valve body".

The valve portion 150 is arranged in the opening 147 while the valve body portion 151 opposes the pusher 123. Pressure is applied to the valve body portion 151 in the direction extending to the valve seat 148 such that the valve projection 155 abuts against the valve seat 148 and the valve body portion 151 blocks the inflow of the fluid into the valve chamber 140 through the inlet port 143 in the valve closed state. Then, the valve body portion 151 is separated from the valve seat 148 by being pushed down by the pusher 123 of the diaphragm 120 and the inlet port 143 and the hole portions 153 communicate with each other, so that methanol flows into the valve chamber 140.

As illustrated in FIG. 2, FIG. 3A, and FIG. 4, the cap 110 preferably has a square or substantially square plate shape, for example. The cap 110 preferably is made of a metal, for example, and is formed by die molding using a stainless steel plate. Screw holes 111 configured to secure the cap 110 and the valve housing 130 onto the system housing 160 are provided in the cap 110.

An edge portion 116 of the cap 110 is fixed to the edge portion 132 of the valve housing 130 preferably by welding in a state where the diaphragm 120 is placed on the placement portion 134. In this case, a peripheral edge area 114 of the cap 110 presses and holds the peripheral edge portion 121 of the diaphragm 120 between the peripheral edge area 114 and the placement portion 134.

A hole portion 115 communicating with the outside air is provided in a center area 113 of the cap 110. This causes the atmospheric pressure to be applied to an upper portion of the diaphragm 120.

The pressure receiving plate 125 preferably has a circular or substantially circular plate shape and is provided on the second surface of the center portion 122 on the diaphragm 120. The area of the pressure receiving plate 125 and the area of the center portion 122 on the diaphragm 120 are the same or substantially the same. The rigidity of the pressure receiving plate 125 is preferably higher than the rigidity of the diaphragm 120, and the pressure receiving plate 125 is made of a metal, for example. The pressure receiving plate 125 receives a differential pressure between the above-mentioned atmospheric pressure that is applied to the second surface of the diaphragm 120 and the internal pressure of the valve chamber 140.

The area of the connecting surface between the pusher 123 and the diaphragm 120 is smaller than the area of the second surface of the diaphragm 120. The tip end of the pusher 123 in the projecting direction abuts against the valve portion 150 through the inlet port 143 of the valve housing 130 in a non-adhesion state.

The pusher 123 and the valve portion 150 are not necessarily required to abut against each other and may oppose each other. Note that the distance from the tip end of the pusher 123 in the projecting direction to the valve portion 150 needs to be larger than an operation distance which is a distance from a position at which the diaphragm 120 is in the state of being not operated to a position at which the diaphragm 120 abuts against the valve portion 150.

Next, operations of the valve 101 will be described.

Figure 5A:
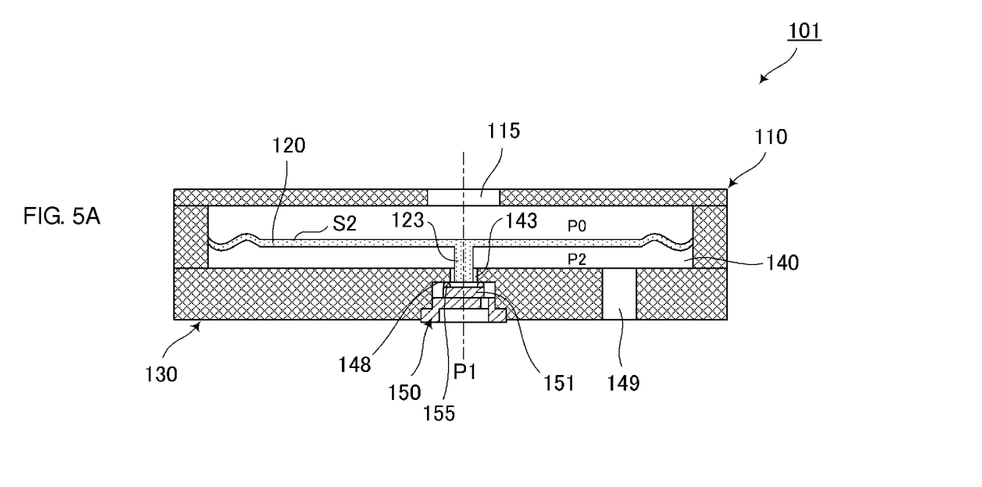
FIG. 5A is a schematic cross-sectional view of the valve 101 illustrated in FIG. 1 in a valve closed state.
Figure 5B:
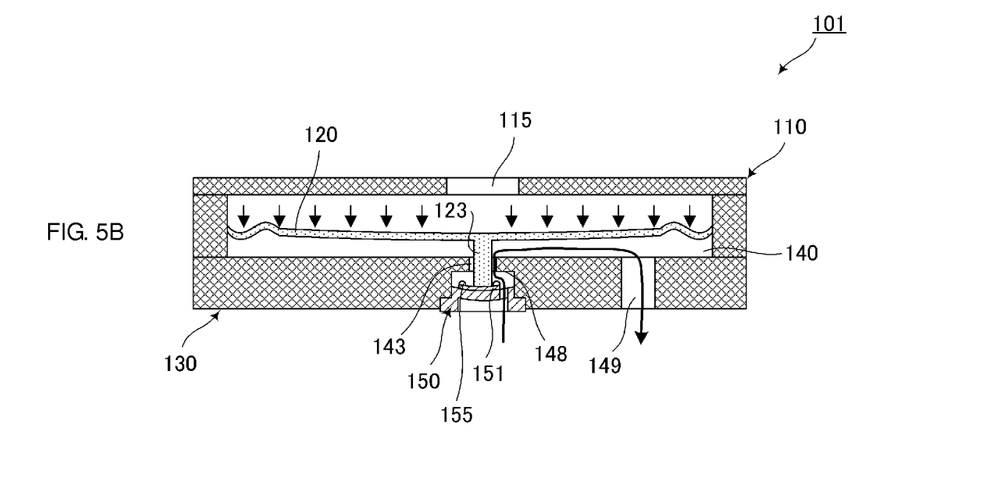
FIG. 5B is a schematic cross-sectional view of the valve 101 illustrated in FIG. 1 in a valve opened state.

FIG. 5A is a schematic cross-sectional view of the valve 101 according to the present preferred embodiment in a valve closed state. FIG. 5B is a schematic cross-sectional view of the valve 101 according to the present preferred embodiment in a valve opened state.

The valve 101 is configured such that when the pressure of the fluid reaches a set pressure, the valve portion 150 is opened or closed automatically using pressure difference. To be more specific, it is assumed that an atmospheric pressure of an upper portion of the diaphragm 120 is P0, a primary pressure of a valve upstream portion is P1, a pressure of a valve downstream portion is P2, an area of the valve body portion 151 (an area determined by the diameter of a region surrounded by the valve projection 155 since the ring-shaped valve projection 155 is formed on the valve body portion 151) is S1, an area of the center portion 122 of the diaphragm 120 which contacts with the valve chamber 140 (hereinafter, referred to as "pressure receiving area") is S2, and a force biasing the valve seat 148 by the valve body portion 151 is Fs.

In this case, a condition under which the valve portion 150 is opened as illustrated in FIG. 5B is represented by (P1−P2)S1+Fs<(P0−P2)S2 based on pressure balance. When P2 is higher than the pressure satisfying the condition, the valve 150 is closed; when P2 is lower than that, the valve 150 is opened.

Therefore, in the valve 101, when the pressure in the valve chamber 140 is lowered by suction of methanol by the pump 103, the center portion 122 of the diaphragm 120 is displaced and the pusher 123 pushes down the valve portion 150 (see FIG. 5B). This makes the inlet port 143 and the valve chamber 140 in a communicating state so that methanol flows into the valve chamber 140 through the inlet port 143.

Next, the force pushing down the valve body portion by the diaphragm when the peripheral edge portion of the diaphragm is pressed in the non-operating state of the pump is compared among the valve 101 in the present preferred embodiment, a valve 11 in a first comparison example, and a valve 21 in a second comparison example.

Figure 6A:
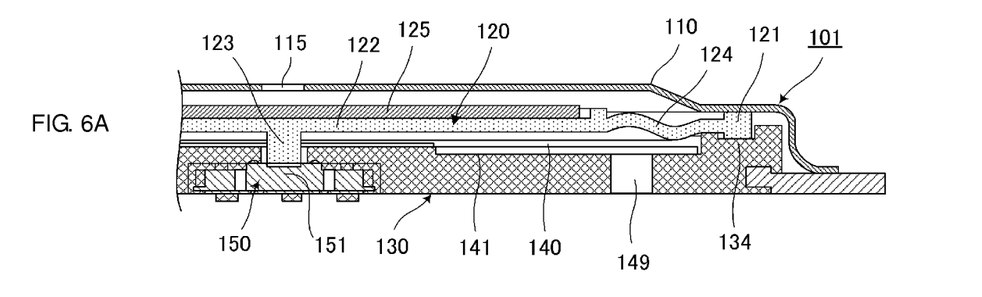
FIG. 6A is a partial enlarged cross-sectional view of the valve 101 illustrated in FIG. 4.
Figure 6B:
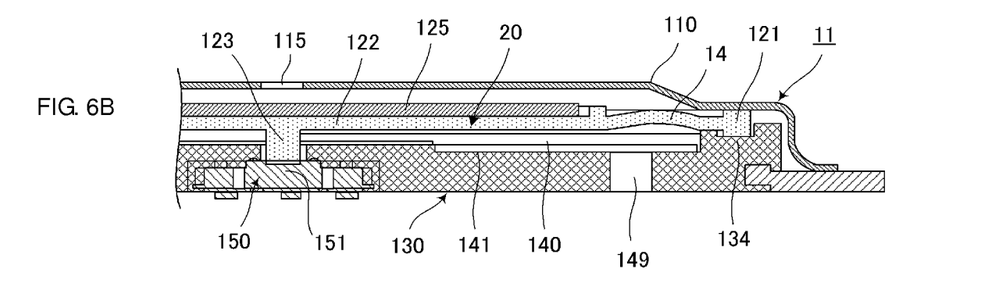
FIG. 6B is a partial enlarged cross-sectional view of a valve 11 according to a first comparison example.
Figure 6C:
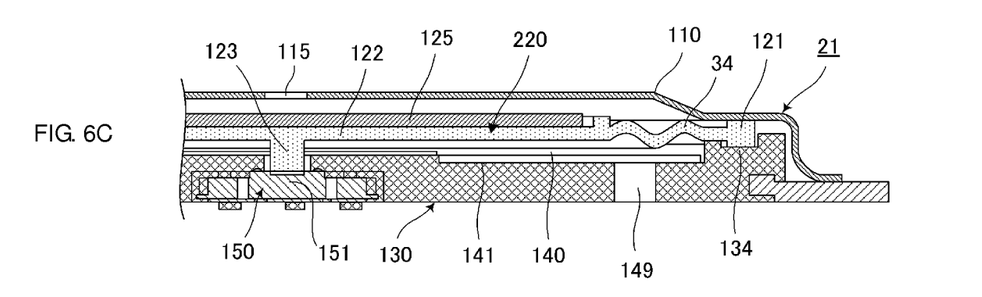
FIG. 6C is a partial enlarged cross-sectional view of a valve 21 according to a second comparison example.
Figure 7:
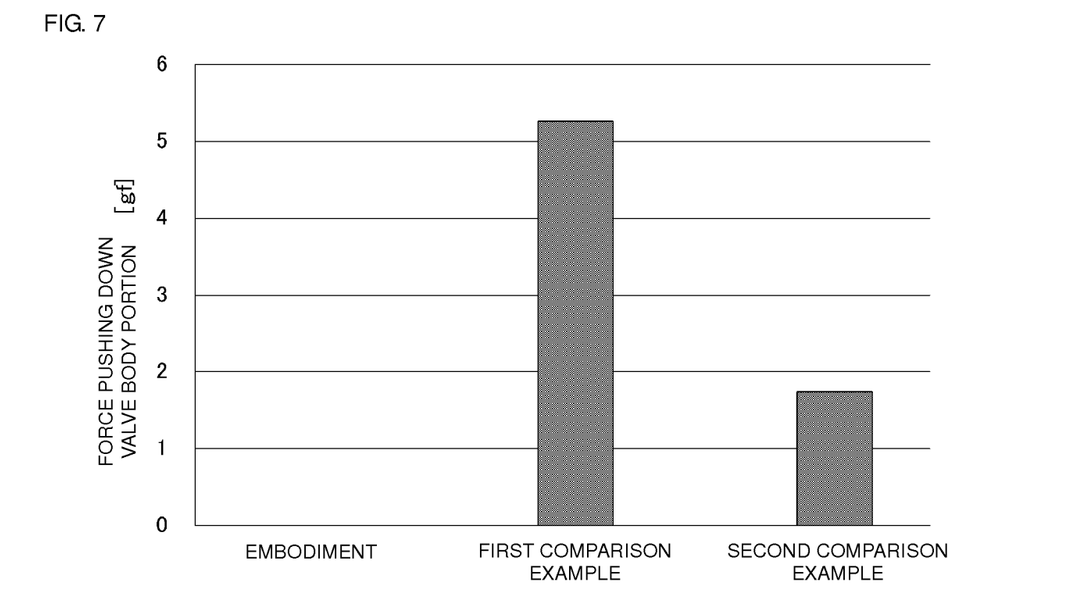
FIG. 7 illustrates bar graphs indicating a push-down force applied to a valve body portion 151 by a pusher 123 of each of diaphragms illustrated in FIGS. 6A to 6C.

FIG. 6A is a partial enlarged cross-sectional view of the valve 101 illustrated in FIG. 4. FIG. 6B is a partial enlarged cross-sectional view of the valve 11 in the first comparison example. FIG. 6C is a partial enlarged cross-sectional view of the valve 21 in the second comparison example. FIG. 7 illustrates bar graphs indicating the forces pushing down the respective valve body portions by the diaphragms illustrated in FIGS. 6A to 6C when the peripheral edge portions of respective diaphragms are pressed.

The valve 11 in the first comparison example as illustrated in FIG. 6B is different from the valve 101 in the present preferred embodiment in that the number of waves of a connecting portion 14 of a diaphragm 20 is 0.5, and other configurations are the same. Likewise, the valve 21 in the second comparison example as illustrated in FIG. 6C is different from the valve 101 in the present preferred embodiment in that the number of waves of a connecting portion 34 of a diaphragm 220 is 1.5, and other configurations are the same.

In this experiment, the force pushing down the valve body portion 151 by the pusher 123 of each diaphragm (hereinafter, referred to as the push-down force by the pusher 123) was calculated for each of the valves 101, 11, and 21 in the non-operating state of the pump 103. To be specific, the force was calculated at a position at which the tip end of the pusher 123 in the thickness direction of each diaphragm abuts against the pusher 123 side main surface of the valve body portion 151 of the valve portion 150 inserted into the opening 147 of the valve housing 130 under the condition that the peripheral edge portion 121 of each diaphragm is held and compressed between the cap 110 and the valve housing 130.

As illustrated in FIG. 7, it was determined that the push-down force by the pusher 123 of the diaphragm 20 having half a wave in the first comparison example and the push-down force by the pusher 123 of the diaphragm 220 having 1.5 waves in the second comparison example were about 5.3 gf and about 1.8 gf, respectively, while the push-down force by the pusher 123 of the diaphragm 120 having 1 wave in the present preferred embodiment was 0.0 gf.

The reason for this result is considered to be as follows. That is, in the valves 11 and 12 in the first and second comparison examples, respectively, a force of moment to displace the center portion 122 of the diaphragm 20 or 220 in the direction of being closer to the valve body portion 151 was applied.

Further, in the valve 101 in the present preferred embodiment, a force of moment to displace the center portion 122 of the diaphragm 120 in the direction of being separated from the valve body portion 151 was applied.

Based on the result of the experiment, in the valve 101 in the present preferred embodiment, the number of waves of the connecting portion 124 is an integer, and therefore, the force of moment to displace the center portion 122 of the diaphragm 120 in the direction of being separated from the valve body portion 151 acts. As a result, even when the peripheral edge portion 121 of the diaphragm 120 is pressed, the displacement of the diaphragm to the valve body portion 151 side can be suppressed in comparison with the existing technique.

Although the connecting portion 124 of the diaphragm 120 in the present preferred embodiment has the wave shape with 1 wave, it may have a wave shape with equal to or more than 2 waves in a practical case. Also with the wave shape with the plurality of waves, the force of moment to displace the center portion 122 of the diaphragm 120 in the direction of being separated from the valve body portion 151 is applied.

Next, the valve 101 in the present preferred embodiment and a valve 31 according to a third comparison example are compared.

Figure 8:
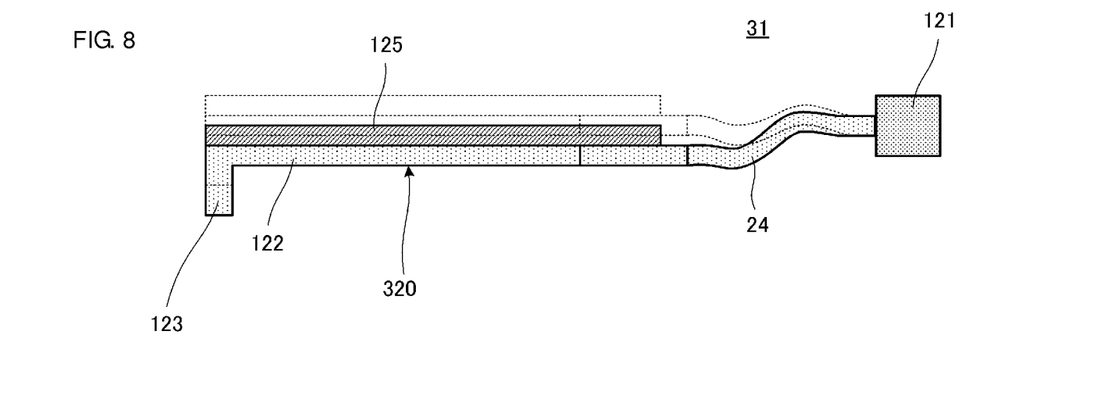
FIG. 8 is a partial enlarged cross-sectional view of a diaphragm 320 included in a valve 31 according to a third comparison example.

FIG. 8 is a partial enlarged cross-sectional view of a diaphragm 320 included in the valve 31 in the third comparison example.

The valve 31 in the third comparison example is different from the valve 101 in the present preferred embodiment in the following point and other configurations are the same. That is, in the valve 31 in the third comparison example, a connecting portion 24 of the diaphragm 320 has a wave shape such that first projects to the cap 110 side and next projects to the valve body portion 151 side, from the peripheral edge portion 121 side toward the center portion 122 side.

The experiment revealed that in the valve 31 in the third comparison example, when the peripheral edge portion 121 of the diaphragm was pressed and held between the cap 110 and the valve housing 130, as illustrated in FIG. 8, the center portion 122 of the diaphragm 320 was displaced in the direction of being closer to the valve body portion 151 in the non-operating state of the pump 103.

The reason for the result is considered to be as follows. That is, the wave shape of the connecting portion 24 of the diaphragm 320 has a phase opposite to the wave shape of the connecting portion 24 of the diaphragm 120. Therefore, the force of moment to displace the center portion 122 of the diaphragm 320 in the direction of being closer to the valve body portion 151 was applied. This result raises a risk that the pusher 123 pushes down the valve body portion 151 to open the valve unintentionally in the non-operating state of the pump 103 in the valve 31 of the third comparison example.

The above-mentioned result indicates that the valve 101 in the present preferred embodiment is the most preferable valve. That is, the valve 101 in the present preferred embodiment includes the diaphragm 120 having the connecting portion 124 with such a wave shape that first projects to the valve body portion 151 side and next projects to the cap 110 side, from the peripheral edge portion 121 side toward the center portion 122 side.

In the valve 101, as described above, the diaphragm 120 includes the connecting portion 124 having such a wave shape that first projects to the valve body portion 151 side and next projects to the cap 110 side, from the peripheral edge portion 121 side toward the center portion 122 side (see FIG. 4).

Therefore, when the edge portion 116 of the cap 110 is bonded to the edge portion 132 of the valve housing 130 and the peripheral edge portion 121 of the diaphragm 120 is compressed by the peripheral edge area 114 of the cap 110 and the placement portion 134, the force of moment to displace the center portion 122 of the diaphragm 120, which is connected to the connecting portion 124, to the cap 110 side (to be specific, in the direction of being separated from the valve body portion 151) acts.

Accordingly, with the valve 101, it is possible to suppress the displacement to the valve body portion 151 side in comparison with the existing technique even when the peripheral edge portion 121 of the diaphragm 120 is pressed.

Further, even when the fuel cartridge 102 that is incorporated in the fuel cell system 100 is heated to a high temperature due to a heating component and the liquid fuel in the fuel cartridge expands, this configuration prevents the valve from being opened in the non-operating state of the pump 103. This also prevents the supply of an excess amount of fuel to the power generation cell 104.

Further, as described above, the size of the total amplitude of the wave shape of the connecting portion 124 of the diaphragm 120 is equal to or smaller than the thickness of the peripheral edge portion 121 of the diaphragm 120. With this configuration, the diaphragm 120 is configured to have a low height. Therefore, the valve 101 including the diaphragm 120 is lowered in height.

The valve 101 does not use silicon as a material thereof. This enables the valve 101 to be manufactured without using a semiconductor process, thus making it possible to manufacture the valve at a lower cost.

Further, the fuel cell system 100 including the valve 101 also achieves the same effects by using the valve 101.

All the materials of the portions 134, 141, 144, 145, and 148 of the valve housing 130 which contact with methanol preferably are made of resin, and the diaphragm 120 and the valve portion 150 are made of rubber, so that no metal ions are eluted into methanol. Accordingly, in the valve 101, deterioration in the properties of the fuel cell system 100 due to the elution of metal ions does not occur.

Other Preferred Embodiments

Although methanol is preferably used as a fluid having high activity in the above-mentioned preferred embodiment, any of gas, liquid, gas-liquid mixture fluid, solid-liquid mixture fluid, or solid-gas mixture fluid can be applied as the fluid in preferred embodiments of the present invention.

In addition, although the diaphragm 120 preferably has a shape such that the thickness of the peripheral edge portion 121 is larger than that of the center portion 122 in the above-mentioned preferred embodiment, the present invention is not limited thereto in a practical case. For example, the diaphragm 120 may have a shape such that the thickness of the peripheral edge portion 121 is smaller than that of the center portion 122 or the thickness of the peripheral edge portion 121 is the same as that of the center portion 122.

Further, although the wave shape of the connecting portion 124 of the diaphragm 120 preferably is a sine wave shape in the above-mentioned preferred embodiment, the wave shape of the connecting portion 124 is not limited thereto. For example, the connecting portion 124 may have a triangle wave shape in a practical case.

Further, although the pressure receiving plate 125 preferably has a circular or substantially circular plate shape in the above-mentioned preferred embodiment, the present invention is not limited thereto. For example, the pressure receiving plate 125 may have a polygonal shape. In addition, although the area of the pressure receiving plate 125 and the area of the center portion 122 of the diaphragm 120 are the same or substantially the same in the above-mentioned preferred embodiment, the present invention is not limited thereto. Note that, however, it is more preferable for these areas to be the same or substantially the same.

Finally, it should be considered that the description of the above-mentioned preferred embodiments is merely an example in all the points and non-limiting. The scope of the present invention is defined not by the above-mentioned preferred embodiments but by the appended claims of the invention. Further, the scope of the present invention is intended to encompass meanings equivalent to the appended claims of the invention and all the modifications within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A valve comprising:
   a valve housing including an inlet port and an outlet port;
   a diaphragm including a center portion, a peripheral edge portion located outside of the center portion, and a connecting portion connecting the center portion and the peripheral edge portion, the peripheral edge portion being located on the valve housing and defining a valve chamber together with the valve housing, and the center portion and the connecting portion being displaced due to pressure of a fluid in the valve chamber;
   a pressure receiving plate that is located on the center portion of the diaphragm;
   a valve body that is arranged in the inlet port and is deformed in response to displacement of the diaphragm to block or release inflow of the fluid into the valve chamber through the inlet port;
   a pusher located on a portion of the center portion of the diaphragm that opposes the valve body; and
   a cap configured to hold the peripheral edge portion of the diaphragm between the cap and the valve housing with a space being located between the cap and the pressure receiving plate, no solid structure is located in the space between the cap and the pressure receiving plate, and the cap including a hole in a center area of the cap; wherein
   the inlet port communicates with the valve chamber when the pusher pushes down a portion of the valve body in the inlet port; and
   the connecting portion of the diaphragm has a wave shape extending from a side of the peripheral edge portion toward a side of the center portion such that the connecting portion first projects toward the valve body, and next projects toward the cap.

2. The valve according to claim 1, wherein the connecting portion of the diaphragm has a shape such that a plurality of wave bottoms projecting toward the valve body and a plurality of wave peaks projecting toward the cap are alternately provided, and a number of the plurality of wave bottoms and a number of the plurality of wave peaks are the same.

3. The valve according to claim 1, wherein the peripheral edge portion of the diaphragm has a thickness larger than a thickness of the center portion.

4. The valve according to claim 1, wherein the diaphragm is configured such that a size of a total amplitude of the wave shape of the diaphragm is equal to or smaller than the thickness of the peripheral edge portion of the diaphragm.

5. The valve according to claim 1, wherein the valve housing has a square or substantially square plate shape.

6. The valve according to claim 1, wherein the valve housing includes a portion made of resin and a portion made of metal.

7. The valve according to claim 1, wherein the diaphragm has a circular or substantially circular plate shape.

8. The valve according to claim 1, wherein the wave shape of the connecting portion is one of a sine wave shape and a triangle wave shape.

9. The valve according to claim 1, wherein a thickness of the connecting portion is the same or substantially the same as a thickness of the center portion.

10. The valve according to claim 1, wherein the diaphragm is made of rubber.

11. The valve according to claim 1, wherein the valve body has a circular or substantially circular shape and is made of rubber.

12. The valve according to claim 1, further comprising a ring-shaped valve projection provided on the valve body at a side of the inlet port.

13. The valve according to claim 1, wherein the cap has a square or substantially square plate shape.

14. The valve according to claim 1, wherein the pressure receiving plate has a circular or substantially circular plate shape.

15. The valve according to claim 1, wherein an area of the pressure receiving plate and an area of the center portion are the same or substantially the same.

16. The valve according to claim 1, wherein the wave shape includes an integer number of waves.

17. A fuel cell system comprising:
the valve according to claim 1;
a fuel storage portion that is connected to the inlet port of the valve; and
a pump that is connected to the outlet port of the valve.

18. The fuel cell system according to claim 17, wherein the fuel storage portion contains methanol.

19. The fuel cell system according to claim 17, wherein the fuel storage portion contains one of a gas, a liquid, a gas-liquid mixture fluid, a solid-liquid mixture fluid, and a solid-gas mixture fluid.

* * * * *